US012626196B2

(12) United States Patent
Baker et al.

(10) Patent No.: US 12,626,196 B2
(45) Date of Patent: May 12, 2026

(54) CENTRAL CABIN CONTROL SYSTEMS AND METHODS

(71) Applicant: B/E Aerospace, Inc., Winston Salem, NC (US)

(72) Inventors: Bryce C Baker, Raymore, MO (US); Pankaj Kalore, Lincolnshire, IL (US); Ashish Shrikhande, Bangalore (IN); Shivashankar Maddanimath Veerayya, Bangalore (IN); Brian E. St. Rock, Andover, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 193 days.

(21) Appl. No.: 18/336,801

(22) Filed: Jun. 16, 2023

(65) Prior Publication Data

US 2024/0330784 A1     Oct. 3, 2024

(30) Foreign Application Priority Data

Mar. 27, 2023     (IN) .............................. 202341021885

(51) Int. Cl.
G06Q 10/02          (2012.01)
B64D 11/02          (2006.01)
B64D 45/00          (2006.01)

(52) U.S. Cl.
CPC ........... G06Q 10/025 (2013.01); B64D 11/02 (2013.01); B64D 45/00 (2013.01)

(58) Field of Classification Search
CPC ...... G06Q 10/025; B64D 11/02; B64D 45/00; B64D 11/04

USPC ......................................................... 340/945
See application file for complete search history.

(56) References Cited

U.S. PATENT DOCUMENTS

| | | | | |
|---|---|---|---|---|
| 6,329,919 B1 * | 12/2001 | Boies | ..................... | G06Q 10/02 |
| | | | | 705/5 |
| 9,481,463 B2 * | 11/2016 | Riedel | ................ | B64D 11/0015 |
| 11,958,606 B2 * | 4/2024 | Vermeulen | ....... | G06Q 10/06315 |
| 2002/0022896 A1 * | 2/2002 | Dugan | ................... | G08B 5/221 |
| | | | | 700/83 |
| 2006/0291632 A1 * | 12/2006 | Mpare | .................... | G07C 11/00 |
| | | | | 379/88.22 |
| 2007/0241927 A1 * | 10/2007 | Ratnakar | ............. | G06Q 10/025 |
| | | | | 244/118.6 |

(Continued)

FOREIGN PATENT DOCUMENTS

| | | |
|---|---|---|
| EP | 3754452 | 12/2020 |
| EP | 3380919 | 1/2021 |
| EP | 3920110 | 12/2021 |

OTHER PUBLICATIONS

European Patent Office, European Partial Search Report dated Sep. 10, 2024 in Application No. 24166883.9.

(Continued)

*Primary Examiner* — Eric Blount
(74) *Attorney, Agent, or Firm* — SNELL & WILMER L.L.P.

(57)          ABSTRACT

A central cabin control system comprises a central controller in operable communication with various sub-systems in an aircraft cabin. The central controller is configured to provide data of various systems to crew members and/or facilitate interactions with various passengers. The central controller is configured for operable communication with each controller disposed in the aircraft cabin.

10 Claims, 8 Drawing Sheets

(56) References Cited

U.S. PATENT DOCUMENTS

| | | | |
|---|---|---|---|
| 2009/0112638 A1* | 4/2009 | Kneller | G06Q 10/00 |
| | | | 705/5 |
| 2012/0232752 A1* | 9/2012 | Reynaud | H04L 12/40156 |
| | | | 701/36 |
| 2018/0285785 A1* | 10/2018 | Smith | B64D 11/02 |
| 2018/0308037 A1* | 10/2018 | Cloyd | B64D 11/0007 |
| 2020/0398988 A1* | 12/2020 | Goyal | G01F 15/063 |
| 2021/0380252 A1* | 12/2021 | Vermeulen | G06Q 10/06315 |
| 2022/0212802 A1* | 7/2022 | Pawliczek | G06Q 10/20 |

OTHER PUBLICATIONS

European Patent Office, European Office Action dated Sep. 24, 2025 in Application No. 24166883.9.

* cited by examiner

400

402
Receiving, by a central controller, a request for a lavatory

404
Analyzing, by the central controller, lavatory occupancy data from each lavatory 406
Analyzing, by the central controller, a service cart location data 408
Assigning, by the central controller, a lavatory to a user based on the lavatory occupancy data and the service cart location data

470

402
Receiving, by a central controller, a request for a lavatory from a passenger 471
Adding, by the central controller, the passenger to a queue 472
Determining if a passenger is still waiting for the lavatory 473
Updating, by the central controller, an estimated time of queue for all passengers 474
Removing, by the central controller, the passanger from the queue

500

502
Determining, by a central controller, that a first water device is low on water 504
Determining, by the central controller, a second water device with excess water capacity 506
Command, by the central controller, the second water device to transfer a portion of water to the first water device

600

602

Receiving, by a central controller, a request for a specific item

604

Determining, by the central controller, a task status of each flight attendant

606

Transmitting, by the central controller, the request to at least one flight attendant

608

Receiving, by the central controller, an indication a flight attendant is handling the request

CENTRAL CABIN CONTROL SYSTEMS AND METHODS

CROSS-REFERENCE TO RELATED APPLICATIONS

This application claims priority to, and the benefit of, India Provisional Patent Application No. 202341021885, filed Mar. 27, 2023 and titled "CENTRAL CABIN CONTROL SYSTEMS AND METHODS," which is incorporated by reference herein in its entirety for all purposes.

FIELD

The present disclosure generally relates to electronic communication systems, and more particularly to central cabin control systems for use an aircraft cabin.

BACKGROUND

A connected aircraft may rely on a central controller to manage multiple interior subsystems or perform prognostic health monitoring. These subsystems may be distributed throughout the aircraft. However, these subsystems may utilize sensors that communicate with a local controller (or any other separate controller) of the subsystem that is independent of the central controller. In this regard, sensors of various subsystems are connected to separate systems and controllers.

Devices within an aircraft cabin not only connect with the aircraft but with each other. For example, a water system may connect to a lavatory and to a galley. However, a water system is typically considered an independent system from a lavatory system. Yet, water system data can help both lavatories and galley products perform better without these products adding additional sensors to get the same data.

SUMMARY

A cabin control system for an aircraft is disclosed herein. In various embodiments, the cabin control system comprises: a central controller configured to be disposed in the aircraft; a first controller for a first lavatory in electronic communication with the central controller; a second controller for a second lavatory in electronic communication with the central controller; a third controller for a galley insert (GAINs) device in electronic communication with the central controller; a fourth controller for a first water device of a water system in the aircraft, the fourth controller in electronic communication with the central controller; and a control panel in electronic communication with the central controller, the control panel configured to display information corresponding to the first lavatory, the second lavatory, the galley insert (GAINs) device, and the first water device.

In various embodiments, the central controller is configured to: receive, through a passenger user interface, a lavatory request; analyze an occupancy status of the first lavatory and the second lavatory; and transmit an assigned lavatory to the passenger user interface based on the occupancy status.

In various embodiments, the cabin control system further comprises a fifth controller for a service cart system, the fifth controller configured to track a location of a service cart. In various embodiments, the central controller is configured to: receive, through a passenger user interface, a lavatory request; analyze an occupancy status of the first lavatory and the second lavatory; analyze a location status of the service cart; and transmit an assigned lavatory to the passenger user interface based on the occupancy status and the location status.

In various embodiments, the cabin control system further comprises a fifth controller for a passenger seat. In various embodiments, the central controller is configured to receive a seat status corresponding to seat back position of the passenger seat from the fifth controller. In various embodiments, the central controller is configured to transmit the seat back position of each passenger seat in an aircraft cabin to the control panel.

In various embodiments, the cabin control system further comprises a fifth controller for a second water device of the water system of the aircraft. In various embodiments, the central controller is configured to: determine that the first water device is low on water; determine that the second water device has an excess water capacity; and command the second water device to transfer a portion of water to the first water device. In various embodiments, the central controller is further configured to receive a water volume status from the fourth controller and the fifth controller.

An article of manufacture is disclosed herein. In various embodiments, the article of manufacture includes a tangible, non-transitory memory configured to communicate with a processor, the tangible, non-transitory memory having instructions stored thereon that, in response to execution by the processor, cause the processor to perform operations comprising: receiving, by the processor, a request for a specific item in an aircraft cabin; determining, by the processor, a task status of each flight attendant in the aircraft cabin; and transmitting, by the processor, the request to a user device based on the task status.

In various embodiments, the operations further comprise receiving, by the processor, an indication from the user device that the flight attendant is handling the request.

In various embodiments, the operations further comprise updating the task status for the flight attendant in response to receiving the indication.

In various embodiments, the request is transmitted to a plurality of user devices, the plurality of user devices including the user device. Each user device in the plurality of user devices can correspond to a respective flight attendant. In various embodiments, the operations further comprise receiving, by the processor, an indication the flight attendant accepted the request.

In various embodiments, the operations further comprise: receiving, by the processor, a second request for a lavatory from a plurality of lavatories; analyzing, by the processor, a lavatory occupancy data for each lavatory in the aircraft cabin; and assigning, by the processor, an available lavatory in the plurality of lavatories based on the occupancy data.

In various embodiments, the operations further comprise analyzing, by the processor, a location status of each service cart in the aircraft cabin, wherein the assigning the lavatory is based on the occupancy data and the location status of each service cart.

A central cabin control system for an aircraft cabin is disclosed herein. In various embodiments, the central cabin control system comprises: a central controller; and a tangible, non-transitory memory configured to communicate with the central controller, the tangible, non-transitory memory having instructions stored thereon that, in response to execution by the central controller, cause the central controller to perform operations comprising: receiving, by the central controller, a request for a lavatory from a passenger; determining, by the central controller and based on data received from each lavatory in the aircraft cabin, an available lavatory for the passenger; and transmitting, by the central controller and through a network, an indication to the passenger of the available lavatory assigned to the passenger.

In various embodiments, the operations further comprise: receiving, by the central controller a second request for a specific item in the aircraft cabin; determining, by the central controller, a task status of each flight attendant; and transmitting, by the central controller, the request to a user device of a flight attendant. In various embodiments, the operations further comprise: determining, by the central controller, that a first water device is low on water; determining, by the central controller, that a second water device has excess water; and commanding, by the central controller, the second water device to transfer a portion of water to the first water device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
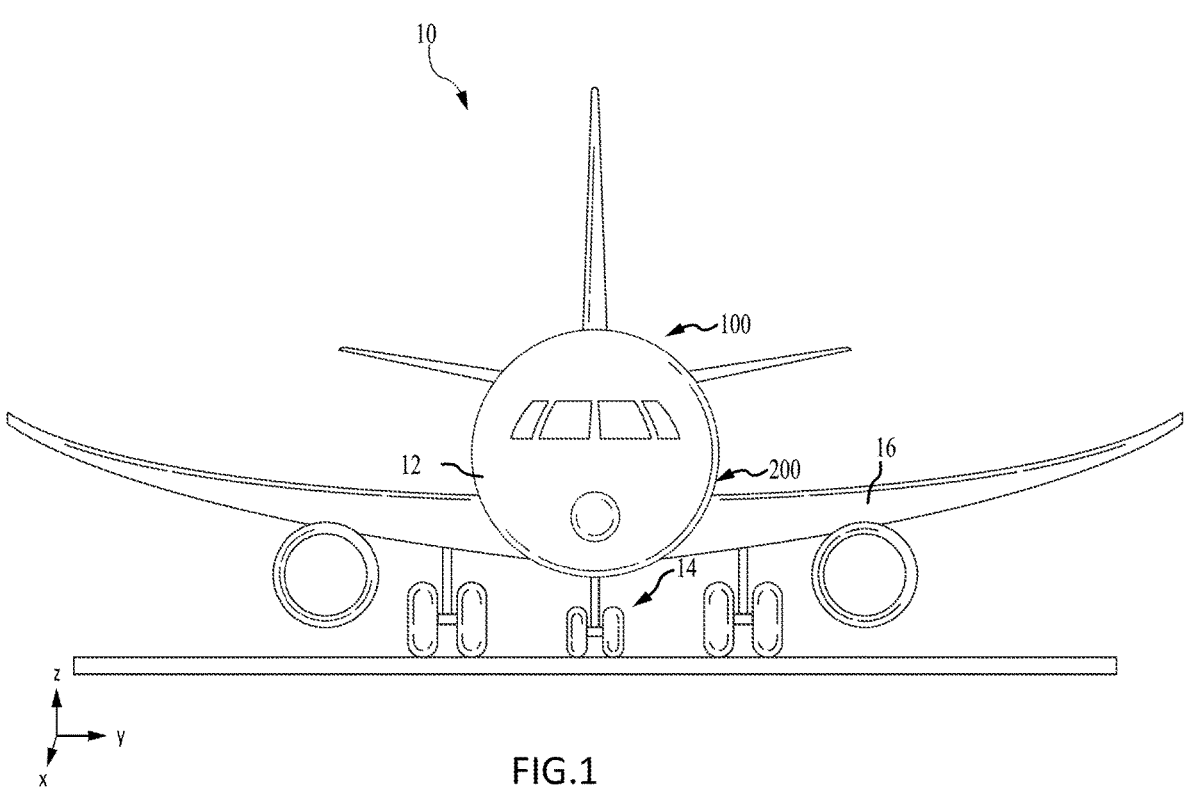
FIG. 1 illustrates a front view of an aircraft, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a system architecture that enables the development and integration of a connected aircraft cabin. For example, the architecture of the system disclosed herein can be built on a new central controller ecosystem to allow all devices within an aircraft cabin to be networked together in a single central controller managing decisions at a cabin level. The microservices capability of the central controller simplifies software development and system integration by allowing multiple applications to be run instead of a standard, monolithic software architecture. The system disclosed herein can also allow for advanced features like centralized data loading and a computational grid. These features are not possible with typical independent subsystems in an aircraft cabin.

In various embodiments, the central controller and architecture disclosed herein can facilitate more efficient management of data. For example, sub-systems with low computational capacity can be loaded on the central controller. This can reduce a total number of parts which reduces costs. Having a common connectivity architecture will simplify integration and reduce non-recurring engineering ("NRE") costs during installation.

In various embodiments, a central controller for a cabin control system disclosed herein can provide a platform to fully network cabin devices into a single system. The interiors controller will use a microservices architecture rather than the more common monolithic architecture. This architecture can allow the software to be separated into functional applications. This can allow new functions to be added or other functions to be removed without effecting the other applications. This architecture also allows all applications to share information to improve decision making and eliminate redundant lines of communication, in accordance with various embodiments. In various embodiments, the architecture disclosed herein allows for a redundant fail-safe architecture as information is shared between applications. For example, the central controller may control a lavatory if the local controller for the lavatory becomes non-responsive. Additionally, a local controller for the local controller of the lavatory can become the central controller if the original central controller becomes non-responsive.

With reference to FIG. 1, a front view of an aircraft 10 is illustrated, in accordance with various embodiments. The aircraft 10 comprises a fuselage 12 and wings 16 extending outward from the fuselage 12. The wings 16 are designed and configured to produce a lift force in response to a pressure difference generated by the wings 16 exceeding a weight of the aircraft 10. The aircraft 10 can comprise landing gear 14 configured to be deployed for landing and used during taxi, or the like. The fuselage 12 defines an aircraft cabin 100 therein. The aircraft cabin 100 includes seats for passengers, a cockpit for pilot(s), various lavatories, as well as various electronics. For example, electronics within an aircraft cabin 100 can include coffee maker(s), passenger service units (PSUs), passenger address (PA) systems, galley equipment, such as beverage makers, cookers, refrigeration units, etc., in-flight entertainment, such as personal video devices (i.e., computers) or the like, satellite systems (e.g., WiFi), or the like. In various embodiments, the aircraft cabin 100 can further include electronics for sub-systems. For example, the aircraft cabin 100 can include various sensors for an evacuation system (i.e., for monitoring the evacuation system), sensors for monitoring an aircraft environment (e.g., a cabin pressure, an air quality, etc.), or the like. The present disclosure is not limited in this regard.

In various embodiments, the aircraft cabin 100 includes a cabin control system 200. In this regard, various sub-systems in the aircraft cabin 100 can be electronically coupled to a central controller of the cabin control system 200, as described further herein. Stated another way, the cabin control system 200 can facilitate a single central control for all (or a majority) of electronics disposed in, or around, an aircraft cabin 100, as described further herein.

Figure 2:
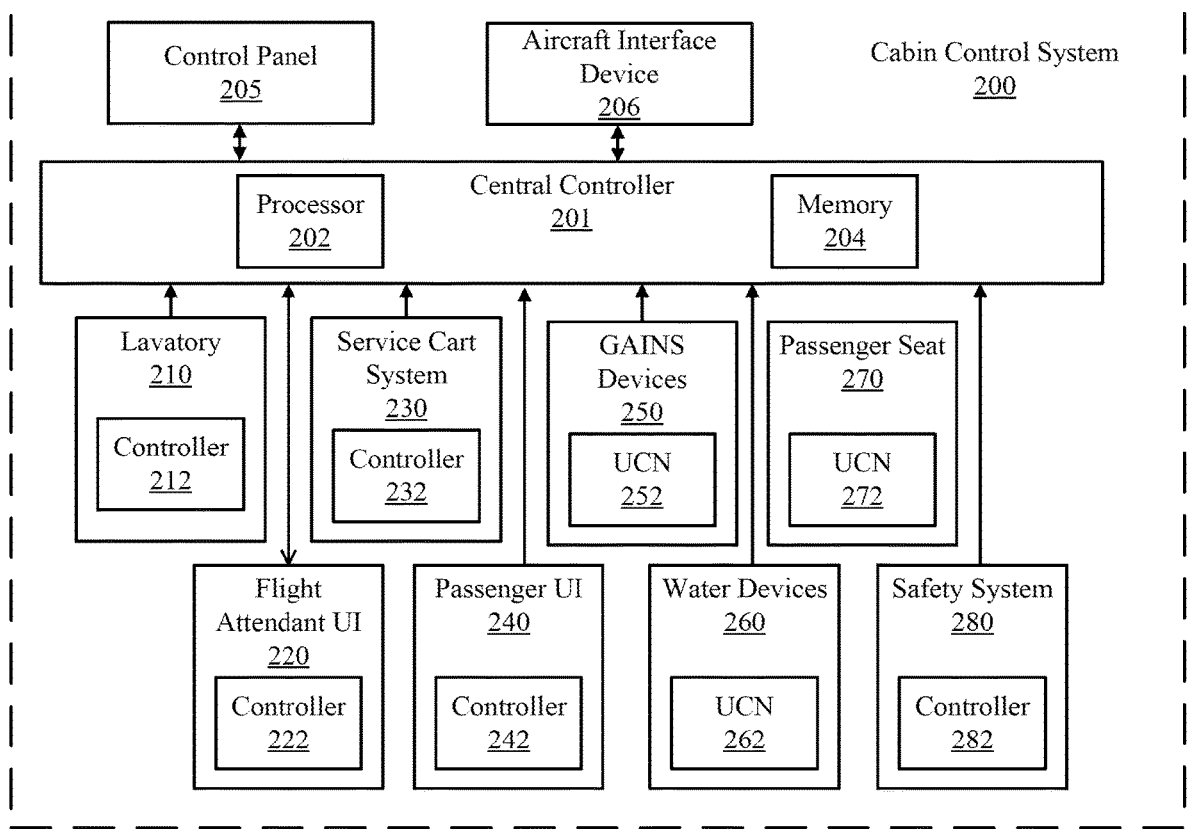
FIG. 2 illustrates a central cabin control system for an aircraft cabin of an aircraft, in accordance with various embodiments.

Referring now to FIG. 2, a schematic view of a cabin control system 200 for an aircraft cabin 100 of an aircraft 10 from FIG. 1 is illustrated, in accordance with various embodiments. The cabin control system 200 comprises a central controller 201, a control panel 205, a plurality of sub-systems (e.g., a lavatory 210, a flight attendant user interface (UI) 220, a service cart system 230 (e.g., a service cart tracking system), a passenger UI 240, galley insert (GAIN(s)) devices 250, water devices 260, passenger seat 270 (e.g., a passenger seat device), safety system 280, etc.), each sub-system including a respective controller (e.g., controllers 212, 222, 232, 242, 282 and/or UCN 252, 262, 272). In various embodiments, although some controllers are illustrated as universal communication nodes ("UCNs"), the present disclosure is not limited in this regard. For example, each UCN 252, 262, 272 can be a local controller, in accordance with various embodiments. In various embodiments, by utilizing UCNs 252, 262, 272, the cabin control system 200 can be retrofitted on existing aircrafts, in accordance with various embodiments.

In various embodiments, GAINs devices 250, such as a galley oven, a galley boiler, a galley beverage maker, etc. are typically connected to a master galley control unit. In this regard, by retrofitting each GAINs device 250 with a UCN (e.g., UCN 252) as described further herein, a cabin control system 200 can be retrofitted into an aircraft cabin 100 without having to replace each GAINs device 250 disposed therein. Stated another way, a master control unit of a galley can be replaced with local controllers (e.g., UCN 252) for each respective GAIN device 250, and the local controller (e.g., the UCN 252) can be electronically (e.g., wirelessly or wired) coupled to the central controller 201 for central management as described further herein. However, the present disclosure is not limited in this regard. For example, the central controller 201 can be coupled to a respective master control unit of a galley (e.g., a GAINs device controller) and still be within the scope of this disclosure. In this regard, the GAINs devices 250 can have a server/client relationship with the galley controller, and human machine interface ("HMI") settings for the GAINs devices 250 can reside in the galley controller. Accordingly, new recipe information can be pushed from the central controller 201 to the galley controller and show up in a respective galley controller menu, in accordance with various embodiments.

Similarly, water devices 260 (e.g., devices that manage a potable water supply to the lavatory and GAINs devices 250) typical have a water system control unit. In this regard, a UCN 262 can be retrofitted to provide each respective water device 260 with a local controller (e.g., a UCN 262) to prevent entirely new water devices from being installed and/or to utilize existing architecture. In various embodiments, UCNs can further be utilized to add features to an aircraft cabin 100 from FIG. 1. For example, UCN 272 and a position sensor can be added to a passenger seat 270. In this regard, the position sensor can be configured to measure a position of a respective passenger seat 270. Accordingly, the UCN can transmit position data to the central controller 201 to provide the position information to flight attendants for use in ensuring seat backs are up prior to landing and takeoff, in accordance with various embodiments.

In various embodiments, the central controller 201 is configured as a central network element or hub to various systems and components of the cabin control system 200. In various embodiments, the central controller 201 comprises a processor (e.g., processor 202). In various embodiments, the central controller 201 may be implemented as a single controller (e.g., via a single processor 202 and associated memory 204). In various embodiments, the central controller 201 may be implemented as multiple processors (e.g., a main processor and local processors for various components). The central controller 201 can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The central controller 201 may comprise a processor 202 configured to implement various logical operations in response to execution of instructions, for example, instructions stored on a non-transitory, tangible, computer-readable medium (e.g., memory 204) configured to communicate with the central controller 201. System program instructions and/or controller instructions may be loaded onto a non-transitory, tangible computer-readable medium (e.g., memory 204) having instructions stored thereon that, in response to execution by a central controller 201, cause the central controller 201 to perform various operations.

In various embodiments, the central controller 201 is electronically coupled to each local controller (e.g., controller 212 for lavatory 210, controller 232 for service cart system 230, each UCN 252 for each GAINs device 250, each UCN 262 for each water device 260, each UCN 272 for each passenger seat 270, and/or the controller 282 for the safety system 280). In this regard, the central controller 201 can be configured to receive data from each respective sub-system and/or command devices in each respective sub-system through a local controller of the respective sub-system as described further herein.

In various embodiments, each local controller (e.g., controller 212, 222, 232, 242, 282 and/or UCN 252, 262, 272) can be coupled to one or more sensors. FoOr example, a sensor for galley inserts (i.e., GAINs devices 250) can include sensors typically associated with GAINs devices (e.g., power status of a respective device, hot plate status for a coffee maker, etc.). In various embodiments, a sensor can be a sensor a pressure sensor (e.g., for aircraft cabin pressure, for water pressure, for evacuation system pressure, etc. for a safety system 280), an occupancy sensor (e.g., for a lavatory 210, a passenger seat 270, etc.), a motion sensor (for a lavatory 210, a passenger seat 270, etc.), a position sensor (e.g., for a galley or inventory monitoring system, etc.), a level sensor (e.g., for water device 260 of a potable water system, etc.), humidity sensors (e.g., for cabin environment monitoring, etc.), or the like.

In various embodiments, a UCN in the plurality of UCNs can be coupled to an electrically activated device. For example, for a lavatory 210, an electrically activated device can comprise a light indicating the lavatory is occupied or unoccupied. For a health monitoring system, an electrically activated device can comprise a warning light to indicate a pressure is low for an evacuation system, a potable water system is near full, or the like. The present disclosure is not limited in this regard.

In various embodiments, the central controller 201 is electronically coupled to an aircraft interface device 206. The aircraft interface device 206 can provide flight data to the central controller 201 for distribution to various devices or sub-systems.

In various embodiments, by having a central controller 201 of a cabin control system 200, a high-power computation grid can be achieved. For example, each interior device within the aircraft cabin 100 from FIG. 1 can utilize a same controller ecosystem (e.g., through the central controller 201). In this regard, the commonality can allow for creation of a high-power computational grid, which can be utilized for prognostic health monitoring and other resource intensive analysis at an interior's aircraft level, in accordance with various embodiments.

In various embodiments, the central controller 201 can be configurable to provide prognostic health monitoring. For example, the central controller 201 can report data and results to crew and maintenance teams (e.g., through the aircraft interface device 206 or the like). In this regard, various aircraft data can be sent to a data database for analysis. In various embodiments, the central controller 201 can allow the prognostic health monitoring to be implemented through an application or the like. In various embodiments, a separate distinct controller can be added for prognostic health monitoring, in accordance with various embodiments.

Figure 3:
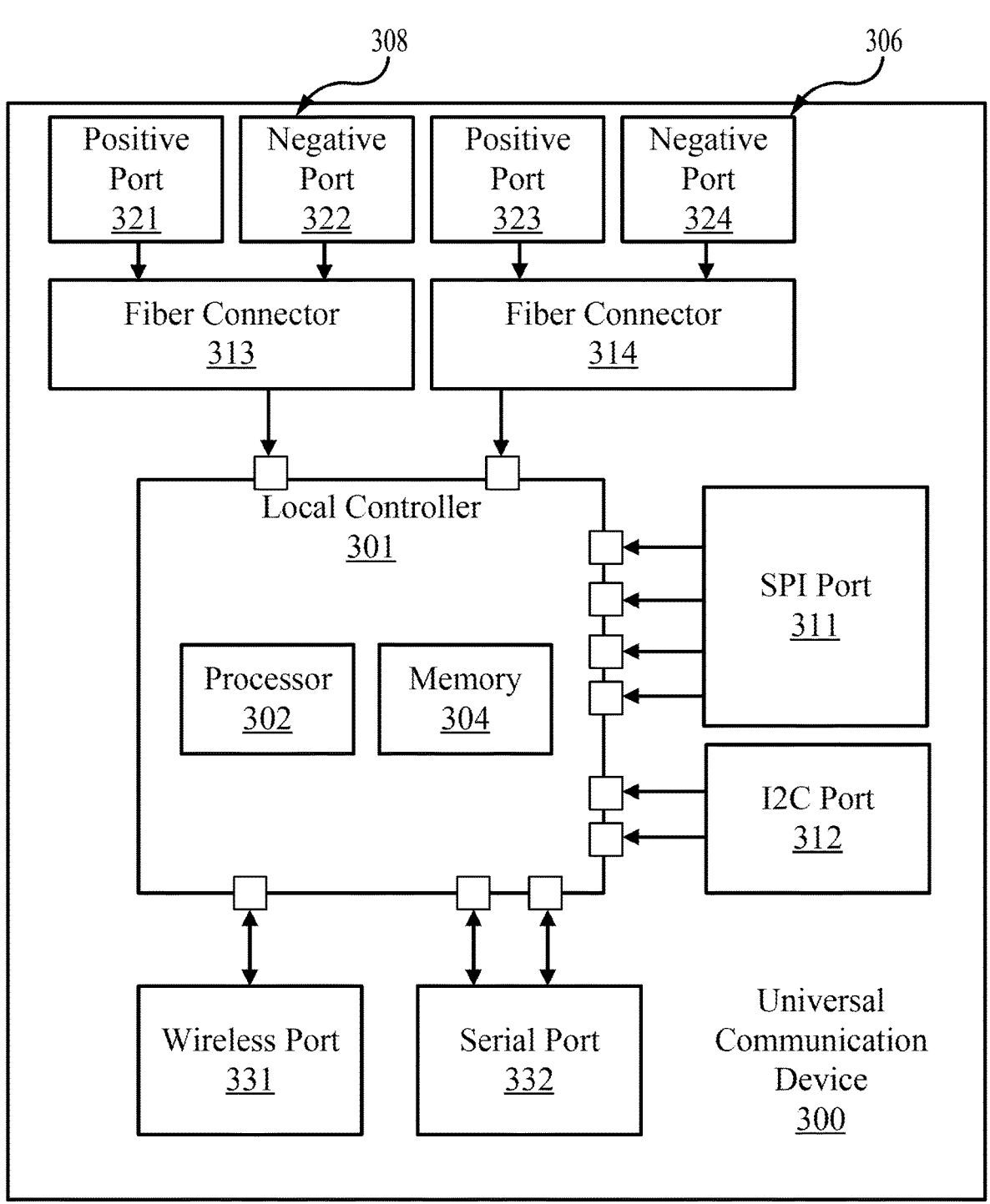
FIG. 3 illustrates a universal communication device for an aircraft cabin of an aircraft, in accordance with various embodiments.

Referring now to FIG. 3, a universal communication device 300 for use in the cabin control system 200 from FIG. 2 (e.g., UCN 252, 262, 272), is illustrated, in accordance with various embodiments. The universal communication device 300 comprises a local controller 301.

In various embodiments, the local controller 301 is configured as a central network element or hub to various systems and components of the universal communication device 300. In various embodiments, local controller 301 comprises a processor (e.g., processor 302). In various embodiments, local controller 301 may be implemented as a single controller (e.g., via a single processor 302 and associated memory 304). In various embodiments, local controller 301 may be implemented as multiple processors (e.g., a main processor and local processors for various components). The local controller 301 can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The local controller 301 may comprise a processor 302 configured to implement various logical operations in response to execution of instructions, for example, instructions stored on a non-transitory, tangible, computer-readable medium (e.g., memory 304) configured to communicate with the local controller 301. System program instructions and/or controller instructions may be loaded onto a non-transitory, tangible computer-readable medium (e.g., memory 304) having instructions stored thereon that, in response to execution by a local controller 301, cause the local controller 301 to perform various operations.

In various embodiments, the universal communication device 300 is configured to communicate with the central controller 201 of a cabin control system 200 (as shown in FIG. 2) of an aircraft cabin 100 of an aircraft (as shown in FIG. 1) (e.g., via a wired or wireless connection). In this regard, the universal communication device 300 can comprise a wireless port 331 (e.g., a wireless input/output port) and a serial port 332 (e.g., a serial input/output port, a serial output port, or the like). In various embodiments, the wireless port 331 is a network port that is configured to connect a wireless access point (e.g., of the universal communication device 300), to a wired network (e.g., of the cabin control system 200 from FIG. 2). In various embodiments, such information may be communicated between the universal communication device 300 and the central controller 201 from FIG. 2 by use of a network in the aircraft 10 from FIG. 1 (e.g., through any network, such as a local area network (LAN), or wide area network (WAN) such as the Internet).

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

In various embodiments, the central controller 201 of the cabin control system 200 from FIG. 2 and the universal communication device 300 can communicate through a short-range wireless technology standard utilizing radio waves (e.g., Bluetooth®, or the like). The present disclosure is not limited in this regard.

In various embodiments, the universal communication device 300 can be electrically coupled to the central controller 201 of the cabin control system 200 (e.g., via the serial port 332 of the universal communication device 300). In various embodiments, the universal communication device 300 can include more than one of the serial port 332. In this regard, the universal communication device 300 can be configured to be coupled to an electrically activated device (e.g., through the wireless port 331 or through the serial port 332). The present disclosure is not limited in this regard.

In various embodiments, the universal communication device 300 further comprises a first analog input 306. For example, the first analog input 306 can comprise a fiber connector 313 (e.g., a square connector, a lucent connector, a multi-fiber connector, a straight tip connector, a ferrule connector, a mechanical transfer registered connector, a miniature square connector, a DIN connector, an E2000 connector etc.). In various embodiments, the fiber connector 313 is a square connector. In this regard, the fiber connector 313 of the first analog input 306 can be configured to interface with fiber connectors typical of aircraft cabins, in accordance with various embodiments. In various embodiments, the first analog input 306 further comprises a positive port 321 and a negative port 322. In this regard, the positive port 321 is configured to receive a positive pin of an electrical connector and the negative port 322 is configured to receive a negative pin of an electrical connector. In this regard, the first analog input 306 is configured to receive an electrical plug of an alternating current (AC) load, in accordance with various embodiments.

In various embodiments, the universal communication device 300 further comprises a second analog input 308 in accordance with the first analog input 306. For example, the second analog input 308 can comprise a fiber connector 314, a positive port 323 and a negative port 324. In various embodiments, fiber connectors 313, 314 can be standard for aircraft cabin application. In various embodiments, the universal communication device 300 can include any number of analog inputs. In various embodiments, the universal communication device 300 can include between two and four analog inputs. In this regard, sub-systems of an aircraft cabin 100 from FIG. 1 can have multiple sensors having analog outputs. Accordingly, the universal communication device 300 can be configured to receive between two and four analog inputs, in accordance with various embodiments. In various embodiments, even if the universal communication device 300 includes multiple analog inputs, only a single analog input can be utilized (e.g., as shown in UCN-2 214 of universal control system 200 from FIG. 2), in accordance with various embodiments. In various embodiments, by having multiple analog inputs (e.g., analog input 306, 308, etc.), the universal communication device 300 can be modular, and utilized in numerous different applications, facilitating economies of scale and/or a reduced part count for products.

In various embodiments, the universal communication device includes a serial peripheral interface ("SPI") port 311 and an inter-integrated circuit ("I2C") port 312. In this regard, the universal communication device 300 can be adaptable for use with various communication protocols for use in sub-system of an aircraft cabin 100 of an aircraft 10 from FIG. 1. In various embodiments, the universal communication device 300 is configured for smart data loading, as described further herein. In various embodiments, an SPI port is configured to interface with an SPI connector to form an SPI communication interface for short-distance communication, primarily in embedded systems. Accordingly, the SPI port 311 can have a wide array of application sin an aircraft cabin 100 from FIG. 1. In various embodiments, an I2C port is configured to interface with an I2C pin to form an I2C circuit. An I2C circuit is a synchronous multi-master/ multi-slave (controller/target), packet switched, single-ended serial communication bus. In various embodiments, I2C circuits are widely utilized in attaching lower-speed peripheral ICs to processors in short-distance, intra-board communication. Accordingly, an I2C port can have a wide array of applications in an aircraft cabin 100 from FIG. 1.

Lavatory Queuing

Figure 4A:
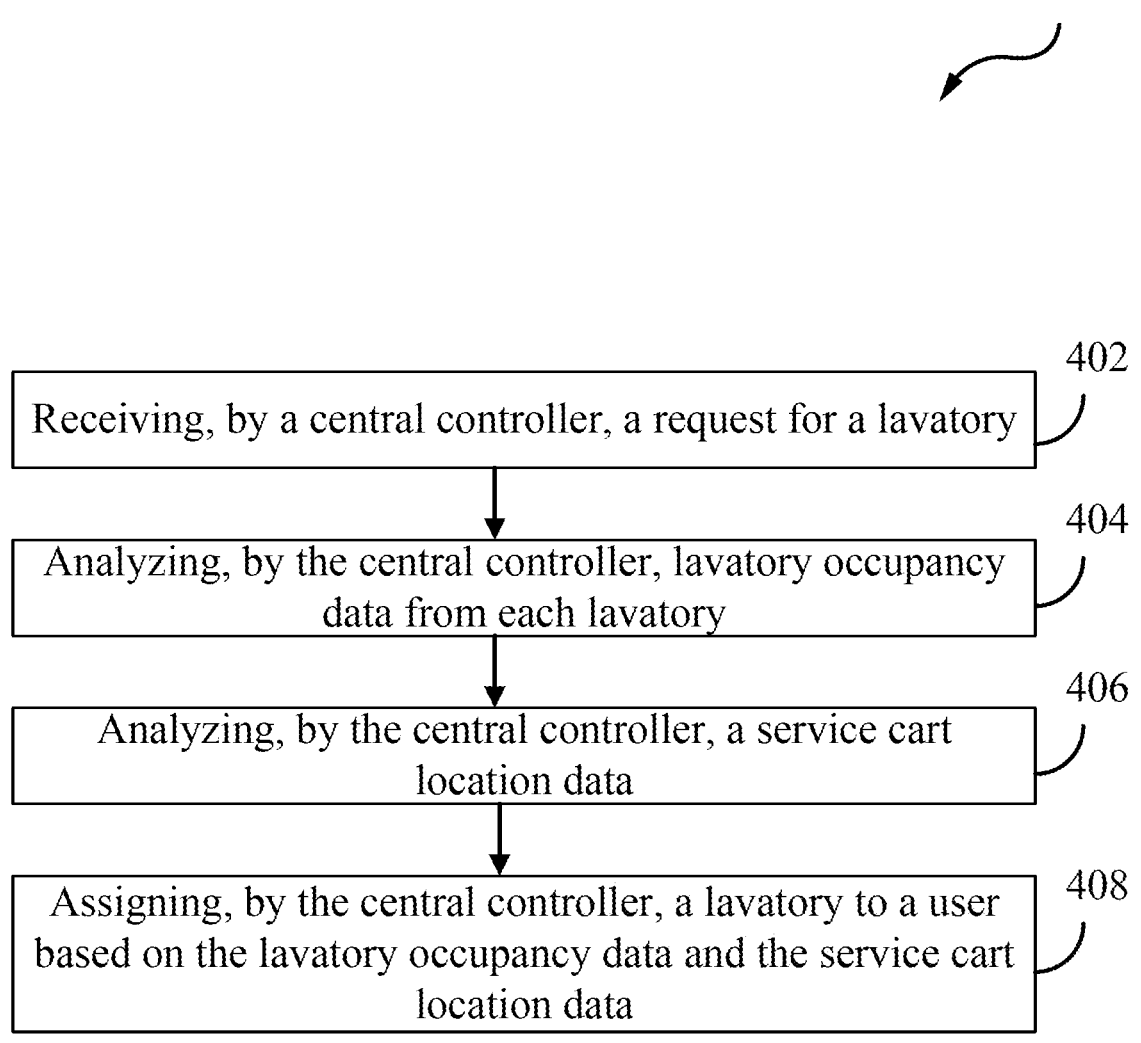
FIG. 4A illustrates a process performed by a central cabin control system, in accordance with various embodiments.

In various embodiments, the cabin control system 200 disclosed herein can facilitate a lavatory queuing process. For example, with reference now to FIG. 4A, a lavatory queuing process 400 is illustrated, in accordance with various embodiments. With combined reference to FIGS. 2 and 4A, the process 400 comprises receiving, by the central controller 201, a request for a lavatory (step 402). In various embodiments, the request for a lavatory can be received through a passenger user interface (UI) 240. For example, a passenger UI 240 can be available through an in-flight entertainment system (IFE), a personal device (e.g., a smart phone, a computer, etc.), or a passenger service unit (PSU) (e.g., as a button or the like). The present disclosure is not limited in this regard. In various embodiments, a controller 242 of the passenger device with the passenger UI 240 can transmit the request to the central controller 201 (e.g., through a network or short-range wireless technology, such as Bluetooth®). In various embodiments, the request for the lavatory will come with a location data for the respective user. For example, IFE or a PSU, the passenger location will be known based on the location of the respective device. Similarly, for a personal device of a passenger, the passenger location may be known based on a location of the device through the passenger UI 240, from data corresponding to the passenger from the passenger UI 240, or the like. The present disclosure is not limited in this regard.

In various embodiments, the process 400 further comprises analyzing, by the central controller 201, lavatory occupancy (step 404). In this regard, the central controller 201 can be continuously receiving an occupancy data of each lavatory in the aircraft cabin 100 from FIG. 1 (e.g., from each controller 212 of each lavatory 210).

In various embodiments, the process 400 further comprises analyzing, by the central controller 201, a service cart location data (step 406). In this regard, similar to the occupancy data of each lavatory 210, the central controller 201 can continuously be receiving a location data of each service cart in the aircraft cabin (e.g., from the controller 232 of the service cart system 230). In various embodiments, if the service cart is obstructing a path to a lavatory for a respective user, the lavatory will not be assigned even if the lavatory is the only lavatory is open. The lavatory may be assigned after the service cart is no longer obstructing a respective path, in accordance with various embodiments.

Based on the location data of each service cart and the location of any unoccupied lavatories, the central controller 201 can assign a lavatory to a user based on the lavatory occupancy data, a passenger location data, and the service cart location data (step 408). In various embodiments, if no lavatory is available, a place in queue may be transmitted to a user interface (e.g., through the passenger UI 240 of a respective device of a user).

In various embodiments, lavatory queuing process can further comprise transmitting a notification to the flight team (e.g., through the flight attendant UI 220 or the control panel 205) after a predetermined number of uses of a respective lavatory, instructing that the lavatory be cleaned and restocked.

Figure 4B:
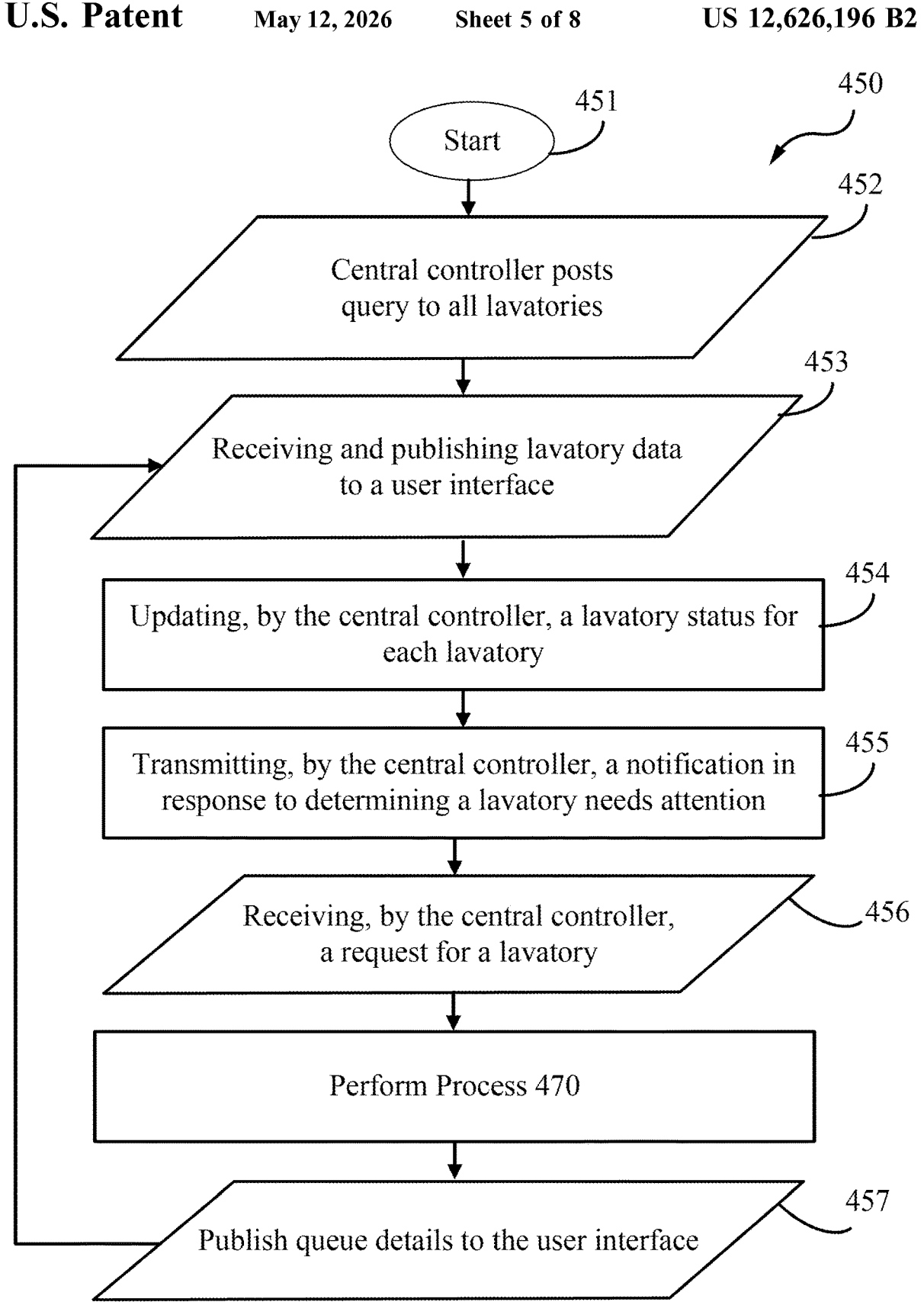
FIG. 4B illustrates a process performed by a central cabin control system, in accordance with various embodiments.

With reference now to FIGS. 2 and 4B, a process 450 performed by the central controller 201 of the cabin control system 200 is illustrated, in accordance with various embodiments. In various embodiments, the process 450 can facilitate a touchless (or non-touchless) connected lavatory queuing management system thorough a wired or wireless interface. In various embodiments, the process 450 starts in block 451. In various embodiments, the process 450 further comprises posting a query, by the central controller 201, to each lavatory in a respective aircraft (step 452). In various embodiments, step 452 can be performed in predetermined intervals (e.g., every 5 seconds, every 5 milliseconds, every 50 milliseconds, or the like). The present disclosure is not limited in this regard.

The process 450 further comprises receiving, by the central controller 201 and from a local controller (e.g., controller 212 of lavatory 210), lavatory data. For example, lavatory data can include a status of various electronics in the lavatory, such as a faucet status, a soap dispenser status, a trash flap status, a toilet seat status, a toilet cover status, etc. In various embodiments, the lavatory data can further include an occupied status of the lavatory (i.e., whether the lavatory is occupied).

The process 450 further comprises updating, by the central controller 201, a lavatory status for each lavatory based on the lavatory data received from the local controller (step 454). In this regard, in response to a lavatory needing attention, as determined by the central controller 201, the central controller 201 can transmit a notification to a flight crew (e.g., through a flight crew user interface and/or a personal device) (step 455). The process 450 can further comprise receiving, by the central controller a request for a lavatory (step 456). In various embodiments, step 456 is in accordance with step 402 of process 400 described previously herein.

In various embodiments, the process 450 further comprises performing a sub-process 470 configured to facilitate and manage a lavatory queueing for passengers, as described further herein. In various embodiments, the process 450 further comprises publishing queue details through a user interface (e.g., through the control panel 205, through a flight attendant UI 220, or the like) (step 457). In this regard, the process 450 can be configured to continuously update a respective user interface, so the crew can be aware of the status of each lavatory on the aircraft 10.

Figure 4C:
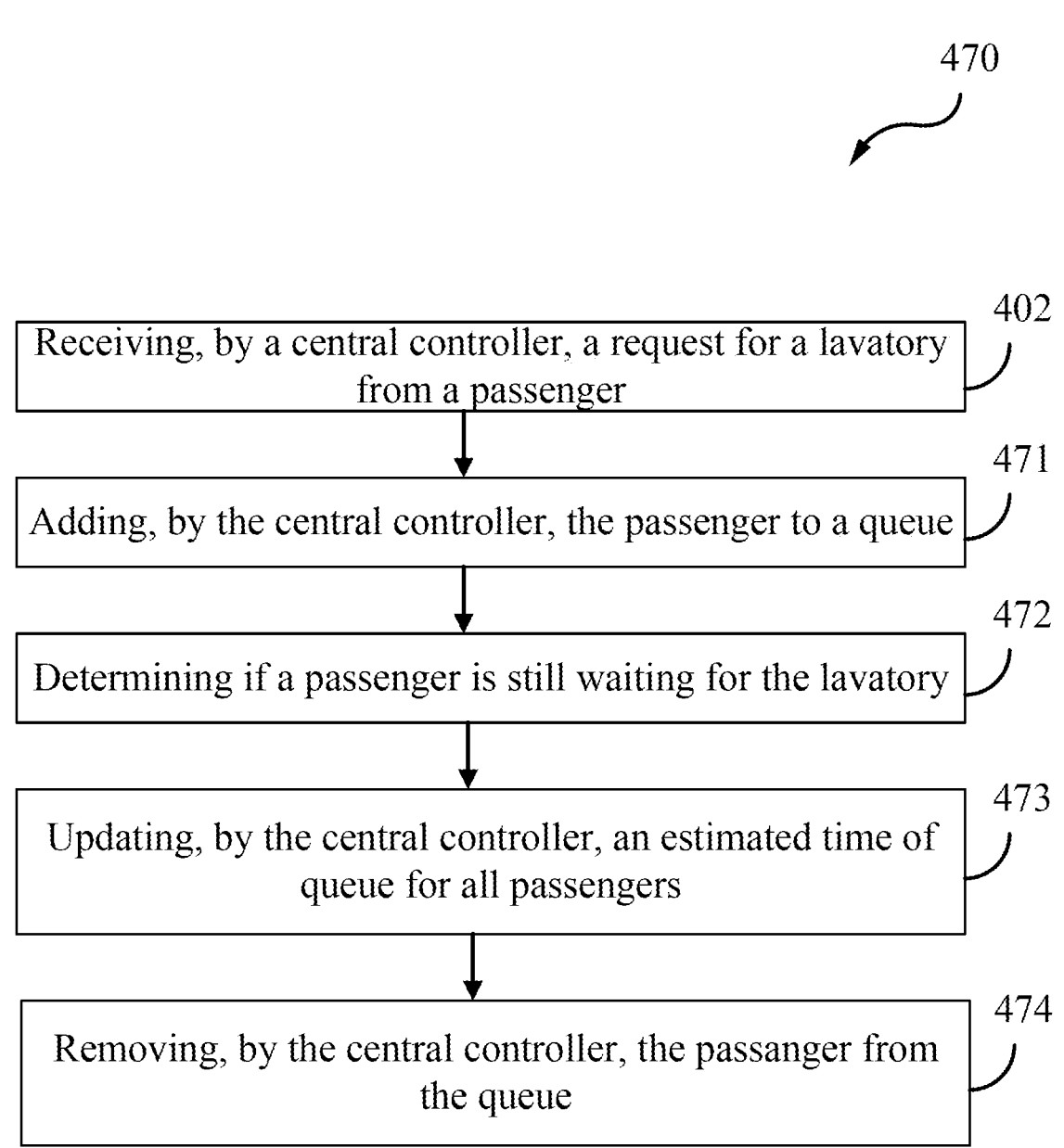
FIG. 4C illustrates a process performed by a central cabin control system, in accordance with various embodiments.

Referring now to FIGS. 2 and 4C, the sub-process 470 from FIG. 4B performed by the central controller 201 is illustrated, in accordance with various embodiments, the process 470 comprises receiving, by a central controller 201, a request for a lavatory from a passenger (step 402). In various embodiments, based on the seat position of the passenger, the central controller 201 can locate a nearest lavatory. The central controller 201 can check the lavatory status of the nearest lavatory and determine whether there are any issues with the nearest lavatory. For example, the central controller can continuously update and store a table corresponding to a status of various electronic devices in each lavatory as shown in Table 1 below.

TABLE 1

| | | | | | |
|---|---|---|---|---|---|
| Example status table generated from process 450 and/or process 470 | | | | | |
| Faucet | Soap Dispenser | Trash Flap | Toilet Seat | Toilet Cover | Status to Crew |
| Faulty | X | X | X | X | Put a Note to use Mechanical Switch on Lav X |
| X | Faulty | X | X | X | InOp Put a InOP Note on Lav X |
| Normal | Soap empty | Normal | Normal | Normal | Refill Soap for Lav X |
| Normal | Normal | Faulty | X | X | InOp Put a InOP Note on Lav X |
| Normal | Normal | Trash Flap full | Normal | Normal | Empty Trash Flap for Lav X |
| Normal | Soap empty | Trash Flap full | Normal | Normal | Refill Soap and Empty Trash Flap for Lav X |
| X | X | Smoke detected | X | X | Fire in Trash Flap of Lav X |
| X | X | X | Faulty | X | Put a note in Lav X to move Toilet Seat manually |
| X | X | X | X | Faulty | Put a note in Lav X to move Toilet cover manually |

TABLE 1-continued

| | | | | | |
|---|---|---|---|---|---|
| Example status table generated from process 450 and/or process 470 | | | | | |
| Faucet | Soap Dispenser | Trash Flap | Toilet Seat | Toilet Cover | Status to Crew |
| X | X | X | Faulty | Faulty | Put a note in Lav X to move Toilet Seat and cover manually |

If there is an issue with the nearest lavatory, based on Table 1 above, the central controller 201 can locate a next nearest lavatory (i.e., based on proximity to a passenger seat). In various embodiments, passengers can be added to a queue for a respective lavatory based on a first to request system (i.e., a passenger that requests prior to a second passenger would be before the second passenger in a respective queue). In various embodiments, the passenger can be given an estimated time until the lavatory is available based on a place in queue and a pre-determined formula. For example, the formula can be estimated time=queue position x average time in lavatory (e.g., 2 minutes, 3 minutes, or the like). In various embodiments, the average time in lavatory in the formula can be updated over time as more data is obtained by the central controller. The present disclosure is not limited in this regard.

In various embodiments, if a seat belongs to a passenger with special needs, an estimated time of the passenger can be increased based on an average time for special needs passengers.

In various embodiments, the passenger can view his or her place in line through a passenger UI 240 from FIG. 2. For example, the passenger UI 240 can show a position in queue for the passenger, a number of seats in front of the passenger in the queue, or the like.

In various embodiments, the passenger is added to a queue for a lavatory determined by the central controller 201 (step 471). In this regard, after the central controller 201 determines a lavatory (e.g., based on a nearest lavatory, shortest queue, a weighted determination, or the like).

In various embodiments, the process 470 further comprises determining, by the central controller 201, if a passenger is still waiting for the lavatory (step 472), and updating, by the central controller 201, an estimated time of queue for the passenger (step 473).

In various embodiments, all passengers queue time (i.e., time until the lavatory is available) can be updated for a respective lavatory simultaneously. For example, in various embodiments, in response to the central controller 201 detecting a change in lavatory occupancy status (e.g., from occupied to vacant), the central controller 201 can assume that the passenger that was first in queue has used the lavatory. The central controller 201 can maintain the passenger in the lavatory queue until step 474 as described further herein or remove the passenger from the queue in response to the lavatory being used. In various embodiments, by keeping the passenger in queue, a passenger would not be removed from the queue before using the lavatory if someone that did not use the queue system utilized the lavatory in front of the passenger, in accordance with various embodiments. In various embodiments, if an estimated time for the passenger is zero, the central controller can be configured to transmit a message to the passenger UI 240 querying the passenger to see if the passenger is still waiting. In various embodiments, based on a response from the passenger, the central controller 201 can update the queue accordingly (i.e., to remove the passenger from the queue in step 474 if the passenger indicates "Finished" or maintain the passenger at the passenger's place in queue if the passenger indicates "still waiting").

An option can be given to passenger through the passenger UI 240 to say that he or she is "Still Waiting" or "Finished" if his or her estimated time is 0. If pressed then a predetermined amount of time (e.g., 3 minutes) can be added to all the estimated times of queue. This process can be repeated every time passenger's estimated time becomes zero.

In various embodiments, the process 470 further comprises removing, by the central controller 201, the passenger from the queue (step 474). In various embodiments, the passenger can be passively removed from the queue, or actively removed from the queue, the present disclosure is not limited in this regard. For example, if a selected lavatory has been unoccupied for more than 3 minutes continuously, as determined by lavatory data received from the respective lavatory, the passenger at the start of the queue can be removed passively. In various embodiments, a passenger can confirm through the passenger UI 240 after the passenger utilizes the lavatory and then the central controller 201 can actively remove the passenger from the queue. The present disclosure is not limited in this regard.

Water Management Systems

Referring back to FIG. 2, the control panel 205 can include a water management system through a respective user interface disposed thereon. For example, the control panel 205 can include a display device and user interface to view data corresponding to the water systems of the aircraft cabin 100 from FIG. 1. In this regard, each UCN 262 of each water device 260 can continuously transmit data corresponding to water system data of the potable water supply to the lavatory 210 and water system data for each respective GAINs device 250. In various embodiments, the cabin control system 200 can provide water system status and information to a flight attendant, or other crew member, through a user interface of the control panel 205, in accordance with various embodiments. In various embodiments, water system status of the potable water supply in the lavatory 210 can be available for use with the GAINs device 250 or vice versa based on a potable water availability.

Figure 5:
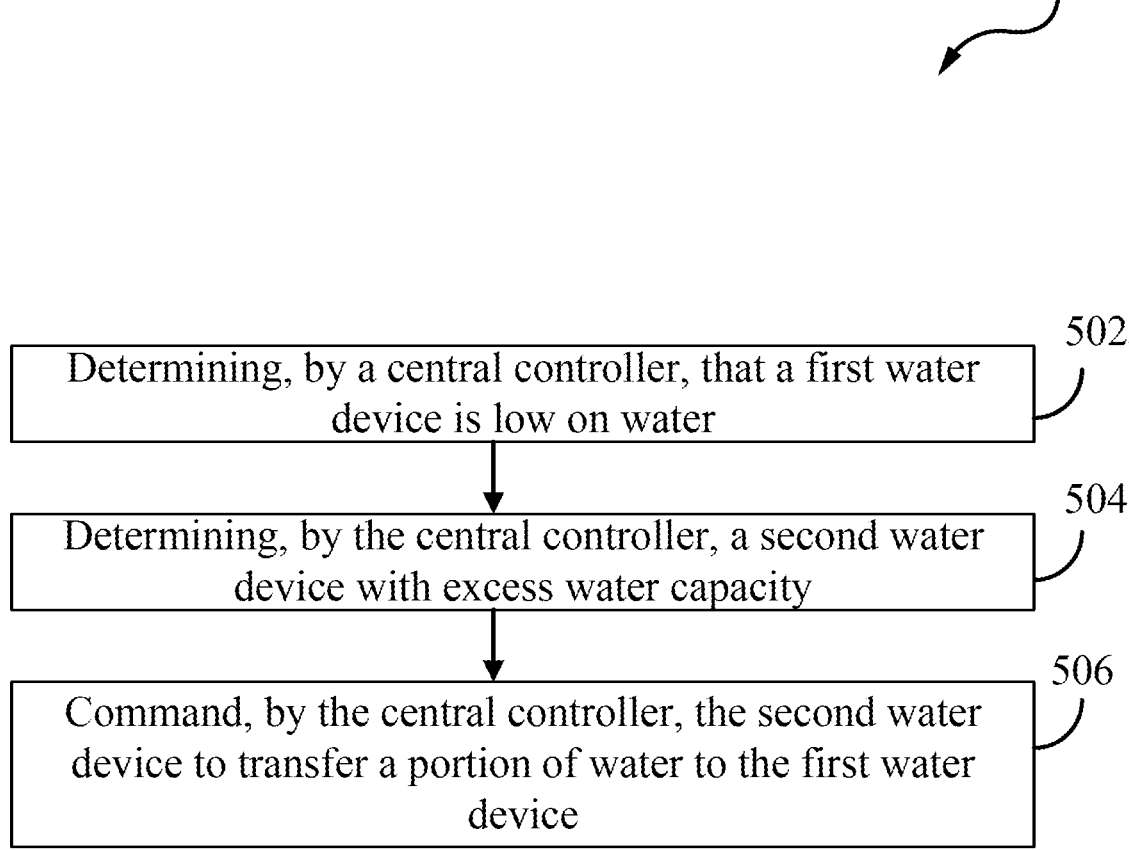
FIG. 5 illustrates a process performed by a central cabin control system, in accordance with various embodiments.

For example, with reference now to FIGS. 2 and 5, a process 500 for re-routing water in a water system of an aircraft cabin 100 from FIG. 1 is illustrated, in accordance with various embodiments. The process 500 comprises determining, by the central controller 201, that a first water device is low on water (step 502). In various embodiments, each water device 260 is transmitting a status of a water level (i.e., an amount of available water) to the central controller 201. In this regard, the central controller 201 can determine that a first water device is low on water (i.e., below a threshold volume of water), in accordance with various embodiments.

In various embodiments, the process 500 further comprises determining, by the central controller 201, a second water device with excess water capacity (step 504). In this regard, the central controller 201 can analyze data corresponding to any other water devices 260 based on data received therefrom. Based on the data, the central controller 201 can command the second water device to transfer a portion of water to the first water device (step 506). In this regard, process 500 can facilitate a more efficient sizing of water for an aircraft cabin as the water can be redistributed throughout the water system, in accordance with various embodiments.

Flight Attendant Application

Referring back to FIG. 2, in various embodiments, passengers can make flight attendant requests from the passenger UI 240 (e.g., available on an IFE, through a PSU, or on a personal device). In various embodiments, the IFE and/or a personal device of a passenger can allow more specific request to be made by passengers to flight attendants in accordance with various embodiments. For example, a passenger can request ear phones, a pillow, a specific drink available on the menu, etc.

In various embodiments, the central controller can receive a respective request from a passenger and transmit the request to the control panel 205 and/or to a personal device (e.g., through a flight attendant UI 220) of a respective flight attendant (e.g., a flight attendant that is closest to the respective passenger as determined by the central controller 201).

In various embodiments, the central controller 201 can track which flight attendants are handling which requests and assign requests accordingly. In various embodiments, the central controller can send a notification to all flight attendants when a request has been made and a flight attendant can accept a request. In various embodiments, if a flight attendant is already handling a request, the flight attendant may be excluded from a notification of a request when other flight attendants are not handling a request. The present disclosure is not limited in this regard.

In various embodiments, the central controller can track a passenger wait time from when a request is received. In this regard, the central controller 201 can assign tasks based on an order received, in accordance with various embodiments.

Figure 6:
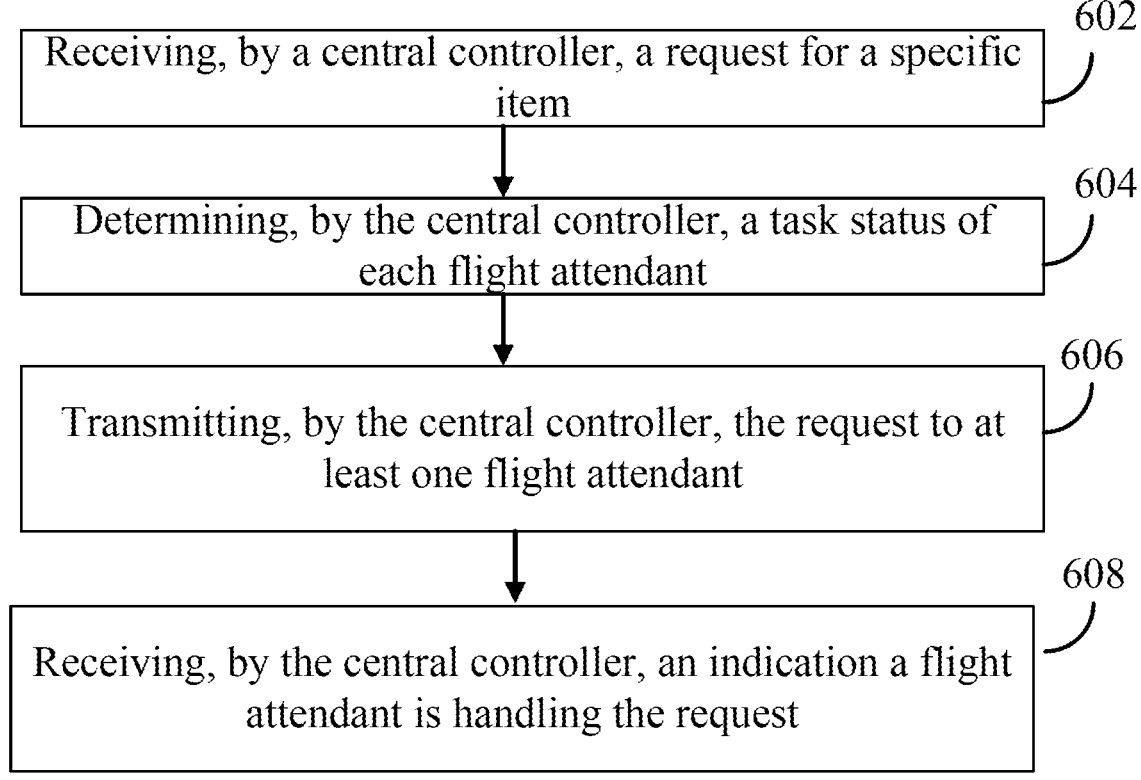
FIG. 6 illustrates a process performed by a central cabin control system, in accordance with various embodiments.

With combined reference now to FIGS. 2 and 6, a process 600 for facilitating passenger requests is illustrated, in accordance with various embodiments. In various embodiments, the process 600 comprises receiving, by a central controller 201, a request for a specific item (step 602). For example, the specific item can include ear phones, a pillow, a specific item on a drink or food menu, etc.

The process 600 can further comprise determining, by the central controller 201, a task status of each flight attendant (step 604). In this regard, a status of tasks that have been accepted through the process 600 can be analyzed by the central controller 201. Stated another way, the flight attendant UI 220 of each flight attendant can be in continuous communication with the central controller 201 (e.g., through a network or the like). Accordingly, the central controller 201 can monitor each flight attendant's task status and send a notification to flight attendants based on an availability of each respective flight attendant, in accordance with various embodiments.

The process 600 can further comprise transmitting, by the central controller 201 (e.g., through a network or the like), the request to at least one flight attendant (step 606). In various embodiments, the request can be assigned, or the flight attendant may have to indicate the flight attendant is accepting the task (i.e., handling the request). The present disclosure is not limited in this regard.

In various embodiments, the process 600 can further comprise receiving, by the central controller 201, an indication a flight attendant is handling the request (step 608). In this regard, the central controller 201 can update a respective task status for the flight attendant, in accordance with various embodiments.

In various embodiments, with reference back to FIG. 2, the flight attendant UI 220 for each flight attendant (or a control panel 205) can be utilized for displaying a safety status of the aircraft for flight attendants based on a time period in a respective flight cycle. For example, during landing or takeoff, a passenger seat status (i.e., upright or down position) can be provided to the control panel 205 and/or the flight attendant UI 220 for each flight attendant. In this regard, a flight attendant can quickly check which seat backs are in a down position and inform the passengers to return them to their upright position prior to takeoff or landing, in accordance with various embodiments. Similarly, the flight attendant UI 220 and/or the control panel 205 can be utilized for display of a seat belt status prior to takeoff or landing and/or during turbulence, in accordance with various embodiments.

GAINs Application

In various embodiments, data corresponding to the GAINs devices 250 and/or the water devices 260 can be displayed through the control panel 205, a respective flight attendant UI 220, or the like, in accordance with various embodiments. For example, health monitoring information can be available to the crew through the control panel 205 and/or a respective flight attendant UI 220. In this regard, crew members can access data corresponding water devices 260 and/or GAINs devices 250 for troubleshooting or the like. In various embodiments, usage information of the GAINs devices 250 and water devices 260 can further be available through the control panel 205 and/or a respective flight attendant UI 220. In this regard, the usage information can potentially support inventory management, in accordance with various embodiments.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A cabin control system for an aircraft, comprising:
   a central controller configured to be disposed in the aircraft;
   a first controller for a first lavatory in electronic communication with the central controller;
   a second controller for a second lavatory in electronic communication with the central controller;
   a third controller for a galley insert (GAINs) device in electronic communication with the central controller;
   a fourth controller for a first water device of a water system in the aircraft, the fourth controller in electronic communication with the central controller;
   a fifth controller for a second water device of the water system of the aircraft, the fifth controller in electronic communication with the central controller; and
   a control panel in electronic communication with the central controller, the control panel configured to display information corresponding to the first lavatory, the second lavatory, the galley insert (GAINs) device, and the first water device, wherein the central controller is configured to:
   determine that the first water device is low on water;
   determine that the second water device has an excess water capacity; and
   command the second water device to transfer a portion of water to the first water device.

2. The cabin control system of claim 1, wherein the central controller is configured to:
   receive, through a passenger user interface, a lavatory request;
   analyze an occupancy status of the first lavatory and the second lavatory; and
   transmit an assigned lavatory to the passenger user interface based on the occupancy status.

3. The cabin control system of claim 1, further comprising a sixth controller for a service cart system, the sixth controller configured to track a location of a service cart.

4. The cabin control system of claim 3, wherein the central controller is configured to:

receive, through a passenger user interface, a lavatory request;

analyze an occupancy status of the first lavatory and the second lavatory;

analyze a location status of the service cart; and transmit an assigned lavatory to the passenger user interface based on the occupancy status and the location status.

5. The cabin control system of claim 1, further comprising a sixth controller for a passenger seat.

6. The cabin control system of claim 5, wherein the central controller is configured to receive a seat status corresponding to seat back position of the passenger seat from the sixth controller.

7. The cabin control system of claim 6, wherein the central controller is configured to transmit the seat back position of the seat in an aircraft cabin to the control panel.

8. The cabin control system of claim 1, wherein the control panel is further configured to display information corresponding to the second water device.

9. The cabin control system of claim 1, wherein the central controller is further configured to receive a water volume status from the fourth controller and the fifth controller.

10. An article of manufacture including a tangible, non-transitory memory configured to communicate with a processor, the tangible, non-transitory memory having instructions stored thereon that, in response to execution by the processor, cause the processor to perform operations comprising:

receiving a first signal from a first controller associated with a first water device;

determining, based on the first signal, that the first water device is low on water;

sending a second signal from a second controller associated with a second water device;

determining, based on the second signal, that the second water device has an excess water capacity; and commanding the second water device to transfer a portion of water to the first water device.

* * * * *